United States Patent [19]

Goel

[11] Patent Number: 4,551,511

[45] Date of Patent: Nov. 5, 1985

[54] MALEIC ANHYDRIDE/STYRENE COPOLYMERIZATION CONTROLLED WITH OXAZOLINES

[75] Inventor: Anil B. Goel, Worthington, Ohio

[73] Assignee: Ashland Oil, Inc., Ashland, Ky.

[21] Appl. No.: 662,759

[22] Filed: Oct. 19, 1984

[51] Int. Cl.[4] .................... C08F 212/08; C08F 112/08
[52] U.S. Cl. ..................................... 526/204; 526/220; 526/272; 526/347; 548/239
[58] Field of Search ............... 526/220, 272, 347, 204; 548/239

[56] References Cited

U.S. PATENT DOCUMENTS

| | | | |
|---|---|---|---|
| 3,725,360 | 4/1973 | Adams | 526/272 X |
| 3,929,748 | 12/1975 | Jurisch | 526/204 |
| 4,056,502 | 11/1977 | Gross | 526/240 X |
| 4,161,571 | 7/1979 | Yasui et al. | 526/272 X |
| 4,180,637 | 12/1979 | Evani et al. | 526/220 X |
| 4,450,261 | 5/1984 | Chiao et al. | 526/272 X |
| 4,460,029 | 7/1984 | Schuetz et al. | 428/395 X |

*Primary Examiner*—Joseph L. Schofer
*Assistant Examiner*—Fred M. Teskin
*Attorney, Agent, or Firm*—John F. Jones

[57] ABSTRACT

Improved copolymers of maleic anhydride and styrene are prepared by including small amounts of an oxazoline in the copolymerization mixture.

4 Claims, No Drawings

MALEIC ANHYDRIDE/STYRENE COPOLYMERIZATION CONTROLLED WITH OXAZOLINES

This invention relates to the control of the copolymerization of maleic anhydride and styrene and more particularly pertains to the process for the moderation of the copolymerization of maleic anhydride to produce higher molecular weight copolymers by the inclusion of an oxazoline in the copolymerization process.

Styrene is known to copolymerize with maleic anhydride in a wide range of molar ratios (up to 50% of maleic anhydride) to give valuable polymers. The copolymerization of styrene and maleic anhydride in a 1:1 molar ratio usually proceeds very rapidly at about 100° C. to give an exothermic, rapid reaction. The use of small amounts of alkyl esters of maleic acid to modify the styrene/maleic anhydride copolymerization is known. The use of oxazolines for the purpose of controlling the copolymerization of styrene/maleic anhydride has not previously been reported.

I have discovered that the inclusion of small amounts of an oxazoline or a bis-oxazoline in the mixture of styrene and maleic anhydride results in controlling the rate and degree of copolymerization of these monomers in an advantageous manner. The use of as little as 0.01% of bis-oxazoline in a styrene/maleic anhydride copolymerization mixture slows the rate of copolymerization significantly and produces copolymers having improved physical properties. Varying amounts of oxazoline in the range of 0.01 to 5.0% by weight when included in the styrene/maleic anhydride copolymerization mixture produces controlled polymerization rates and copolymers having controlled degrees of polymerization. Thus, the process of this invention allows the production of controlled styrene/maleic anhydride copolymers having a wide variation of molecular weights.

In my process the molar ratios of maleic anhydride: styrene can vary from 1:99 to 50:50 and preferably the ratios will fall in the range of from 5:95 to 50:50. The polymerization temperatures of the process can vary from 25° C. to 150° C. and preferably are in the range of from 50° C. to 120° C. It is within the scope of this invention to include a free-radical polymerization initiator in the polymerization mixture if desired. The copolymerization of maleic anhydride and styrene can be carried out either in a solvent or in the absence of a solvent, preferably a solvent is used. Solvents which can be employed in my process include aliphatic ketones such as acetone, methyl ethyl ketone, methyl isobutyl ketone, aromatic hydrocarbons such as toluene and xylenes, ethers such as tetrahydrofuran, esters such as ethyl acetate, methyl acetate and the like.

The oxazolines useful in the process of this invention are those having the formulas

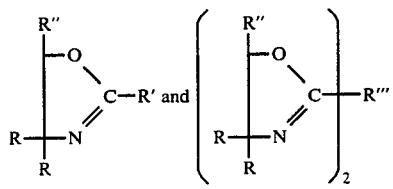

wherein R is independently selected from hydrogen or a hydrocarbon group having from 1 to 12 carbon atoms, R' is a hydrocarbon group having from 1 to 12 carbon atoms and R" is hydrogen or a hydrocarbon group having from 1 to 12 carbon atoms, and R'" is an alkylene or arylene group having from 1 to 17 carbon atoms. Most preferred are oxazolines of the foregoing types in which R is hydrogen or an alkyl group, R' is an alkyl or alkenyl group and R" is hydrogen.

The process of this invention can be carried out in the presence of a free-radical initiator if so desired.

The process of this invention is further illustrated in the following examples.

EXAMPLE 1

This Example which is outside the scope of the present invention demonstrates the uncontrollable, strongly exothermic copolymerization of a maleic anhydride/styrene mixture which has not been treated with an oxazoline. A mixture of 52 g of styrene and 49 g of maleic anhydride was stirred at about 45° C. to give a clear solution. An eight gram portion of this maleic anhydride/styrene solution was added to a test tube which was then placed in a steam bath (temperature about 90° C.). An extremely exothermic polymerization reaction took place causing the temperature of the maleic anhydride/styrene polymerization mixture to rise to 250° C. was observed within ten minutes. During the exothermic copolymerization reaction some of the styrene vaporized from the tube. Characterization of the resulting polymer showed that it had a weight average molecular weight of 7414, a number average molecular weight of 453 and a $M_w/M_n$ of 16.4.

EXAMPLE 2

A repeat of Example 1 with the exception that one drop (0.02 g) of bis-oxazoline (obtained from the reaction of DBE, which is the methyl esters of a mixture of $C_4$, $C_5$ and $C_6$ dibasic acids with a ratio of about 20% $C_4$, 60% $C_5$ and 20% $C_6$ acid with $H_2NC(CH_3)_2CH_2OH$) was added to the maleic anhydride/styrene mixture before the test tube was placed in the steam bath. Some slight exotherm was observed after about 15 minutes, and the temperature of the polymerization mixture rose to 120° C. The polymerization proceeded to produce a solid polymer in about one hour. Characterization of this polymer showed that it had a weight average molecular weight of 243,510, a number average molecular weight of 75,200 and $M_w/M_n$ of 3.24.

EXAMPLE 3

Example 2 was repeated except that 2 drops (0.04 g) of bis-oxazoline was used in the polymerization mixture. Only a minute exotherm was observed and a polymer formed in about one hour. The polymer was found to have the following properties: weight average molecular weight of 351,740, number average molecular weight of 174,960 and a Tg (by DSC method) of 175° C.

EXAMPLE 4

Example 2 was repeated using 0.08 g of bis-oxazoline. No exotherm was observed after two hours at 90° C. but a gelatinous mass was observed in the test tube. Further heating at about 150° C. did produce a polymer which was a solid at room temperature.

EXAMPLE 5

Example 4 was repeated using 0.12 g of oxazoline and gave similar results.

I claim:

1. The process for preparing maleic anhydride/styrene copolymers of higher molecular weight comprising heating a mixture of maleic anhydride, styrene and a small amount of an oxazoline at a temperature in the range of from 50° to 150° C.

2. The process of claim 1 wherein the oxazoline is present in from 0.01 to 5% by weight based on the combined weight of maleic anhydride and styrene.

3. The process of claim 2 wherein the molar ratio of maleic anhydride: styrene in the mixture is in the range of from 5:95 to 50:50.

4. The process of claim 3 wherein the oxazoline is one conforming to at least one of the formulas

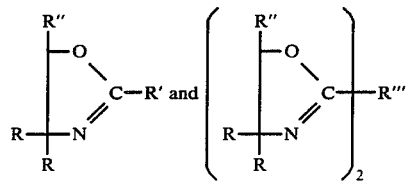

Wherein R is independently selected from hydrogen or a hydrocarbon group having from 1 to 12 carbon atoms, R' is a hydrocarbon group having from 1 to 12 carbon atoms, R" is hydrogen or a hydrocarbon group having from 1 to 12 carbon atoms, and R''' is an alkylene or arylene group having from 1 to 17 carbon atoms.

* * * * *